United States Patent [19]

't Hoen

[11] Patent Number: 4,640,291
[45] Date of Patent: Feb. 3, 1987

[54] BI-PLANE PHASED ARRAY FOR ULTRASOUND MEDICAL IMAGING

[75] Inventor: Pieter 't Hoen, Mission Viejo, Calif.

[73] Assignee: North American Philips Corporation, New York, N.Y.

[21] Appl. No.: 749,613

[22] Filed: Jun. 27, 1985

[51] Int. Cl.⁴ .............................................. A61B 10/00
[52] U.S. Cl. ..................... 128/660; 310/334; 310/335
[58] Field of Search ............... 128/660–661, 128/663; 73/625–626; 367/103, 105; 310/334, 335

[56] References Cited

U.S. PATENT DOCUMENTS

| 4,112,411 | 9/1978 | Alais et al. | 73/626 X |
| 4,324,142 | 4/1982 | Auplion et al. | 73/626 |
| 4,344,159 | 10/1982 | Ballinger | 128/660 X |
| 4,514,247 | 4/1985 | Zola | 156/250 |
| 4,518,889 | 5/1985 | 't Hoen | 310/357 |

OTHER PUBLICATIONS

W.A Smith et al, "Properties of Composite Piezoelectric Materials for Ultrasonic Scanners", Proc. IEEE UTS Symp., Nov. 14–16, 1984, pp. 539–544.

Shoulov, A. A. et al, "Performance of Ultrasonic Transducers Made from Composite Piezoelectric Materials", Proc. IEEE UTS Symp., Nov. 14–16, Dec., 1984, pp. 545–548.

"Properties of Composite Piezoelectric Materials for Ultrasonic Transducers", W. A. Smith et al, 1984 IEEE Ultrasonics Symposium, Dec. 1984.

Primary Examiner—Kyle L. Howell
Assistant Examiner—Francis J. Jaworski
Attorney, Agent, or Firm—Jack E. Haken; James J. Cannon, Jr.

[57] ABSTRACT

A bi-plane phased array transducer for real time medical imaging having a composite piezoelectric disk with an array of transducer-element electrodes disposed on each major surface of said disk, the array on one side being at an angle to the array on the other side and electrical connections to ground each array alternately so that real time sector imaging in two planes is obtained.

3 Claims, 5 Drawing Figures

BI-PLANE PHASED ARRAY FOR ULTRASOUND MEDICAL IMAGING

BACKGROUND OF THE INVENTION

1. Field of the Invention

This invention relates to ultrasonic transducers in general and more particularly to a a disk-shaped ultrasonic transducer arrangement having two matrices of ultrasonic oscillators, and two electrode patterns on opposite major faces of a composite piezoelectric material, each matrix consisting of several acoustically separated transducer elements which are electrically controlled to operate together. The bi-plane phased array permits the real time imaging of two sector planes, which can be at any angle; (in this application, orthogonal planes). In addition, an ultrasound mechanical lens is used which carries good resolution in the plane perpendicular to the actual scan planes.

2. Description of the Prior Art

The use of bi-plane transducer elements in rectangular arrays is known in the prior art. Typical of the prior art are the devices disclosed in U.S. Pat. Nos. 4,112,411 and 4,324,142. However, the mosaic of transducers disclosed in these prior patents cannot be used in a bi-plane phased array. Neither of these prior patents discloses means for securing good resolution transverse to the scan plane at hand.

SUMMARY OF THE INVENTION

In the technology of medical imaging with ultrasound, the phased array principle is well known, though the technical terminology can be semantically misleading. For the purposes of this application, the following definitions will be used. A linear array is an electronically scanned linear array of elements, that is, a group of contiguous transducer elements which are electronically selected from an extended array, being pulsed for transmission and then used for reception of resultant echoes. The selected group is then commutated one or more positions along the array and the process repeated to scan successive parallel regions in the body. The image format is usually rectangular.

A phased array refers to a short array of transducer elements, the transmitted energy being deflected from the normal by inserting delays in the pulse signal to each element and similarly the received response is steered in angle by inserting delays in the signal path from each angle before summation. The resulting image is pie-shaped, the so-called sector scan.

Electronic focusing of both types of arrays is possible by a different set of time delays.

This invention proposes a transducer arrangement to extend the phased array principle to the imaging of two orthogonal planes in real time, a technique which can be of value in certain medical application, for example, for evaluating the dynamics of the human heart. To achieve this purpose, the present invention uses a so-called "composite" piezoelectric disk, making possible a cross-bar electrode system. A material with negligible cross-coupling must be utilized in the fabrication of the proposed bi-plane phased array in order to make the cross-bar electrode pattern possible. The material is classified as composite because it is or may be basically a laminated structure in which a plurality of relatively small parallel cylinders of a piezoelectric ceramic material are aligned with the acoustic axis of the transducer, perpendicular to the major surfaces, and are completely surrounded by an electrically insulating and acoustically damping material. Such a composite material will have negligible cross-coupling, which is necessary for a plurality of transducer elements in close proximity to one another. The bi-plane phased array is fabricated by putting an electrode surface on each major surface of a slice of the composite material and scoring the electrode surfaces such that the scoring on one side is at an angle with the scoring on the other side.

Appropriate electrical connections are made such that all the electrode elements on one electrode surface are grounded, and phasing is performed with the remaining free electrodes to image, according to the phased array principle, in one direction, and alternately all electrode elements on the other electrode surface are grounded so that phasing is performed with the free electrodes on the first side to image in a second direction. This array of transducers is capped on one side by a mechanical lens.

DESCRIPTION OF THE PREFERRED EMBODIMENT

Figure 1:
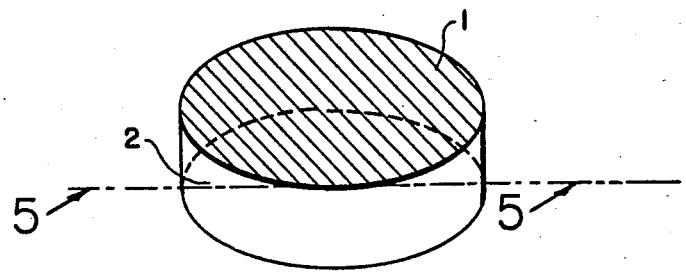
FIG. 1 is a perspective view of a composite piezoelectric disc from which the bi-plane phased array is made.
Figure 2:
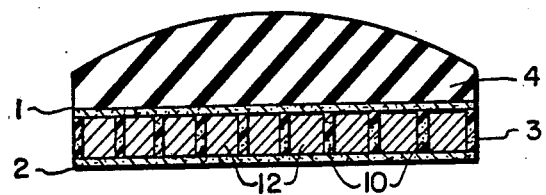
FIG. 2 is a cross-section taken along the line A—A of FIG. 1, additionally showing a cross-section of a convex spherical mechanical lens in place over one major surface of the composite piezoelectric disk.
Figure 3:
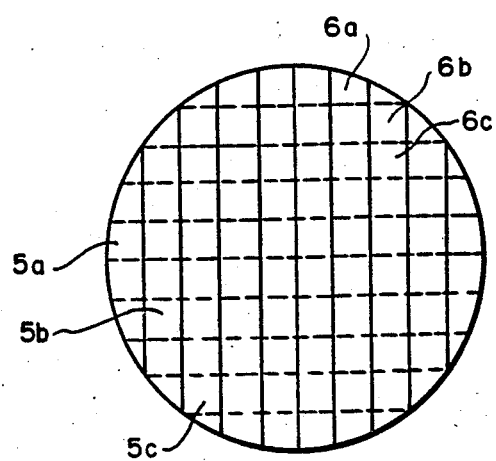
FIG. 3 is a top view of the composite piezoelectric disk showing the electrode pattern configuration of one major surface. The electrode configuration on the other major surface is shown by hatched lines.
Figure 5:
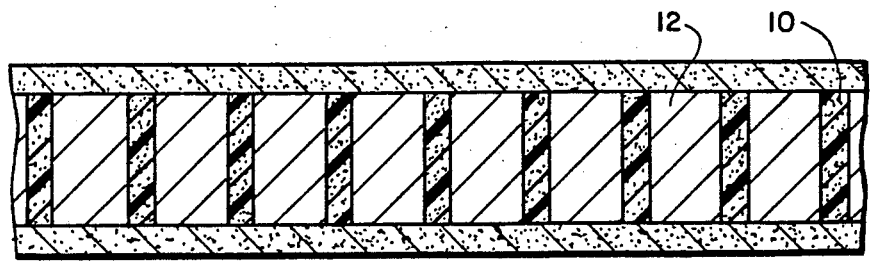
FIG. 5 is a cross-section view of the composite piezoelectric disk before scoring of the electrode configurations.

As shown in FIGS. 1 through 3 and 5, the bi-plane transducer array of the present invention consists of a flat piezoelectric disk 3, the disk shape being used for simplification of electrical connections and to secure good focusing in all directions, fabricated from a composite material, shown in detail in FIG. 5. This material comprises a matrix of parallel cylinders or rods 10 of a piezoelectric ceramic material, distributed in an electrically inert binding material 12 such that each cylinder is completely surrounded by the insulating, damping material 12, said rods 10 extending from one major surface 1 of the disk to the other major surface 2 perpendicular to the diameter of the disk, each major surface having an electrode surface and each electrode surface being scored, as shown in FIG. 3, such that the front electrode surface 1 is scored at an angle different from the scoring of the back electrode 2.

Examples of materials of this type are disclosed in U.S. Pat. No. 4,514,247 issued Apr. 30, 1985 and U.S. Pat. No. 4,518,889, issued May 21, 1985 both of which are assigned to the assignee of this application. Such a material is also illustrated and described in the 1984 IEEE Ultrasonics Symposium Proceedings, December 1984. The lateral spatial periodicity of the composite piezoelectric structure is smaller than all the relevant acoustic wavelengths. Hence the composite behaves as a homogeneous piezoelectric with improved effective material parameters, as discussed in the art cited above. One of the electrode surfaces 1 is designated the front face, the other electrode surface 2 being designated the back face. When used in an ultrasonic transducer for medical imaging, the front face 1 is the face which is placed toward the body of the patient.

FIG. 2 is a cross-section taken along the line A—A of FIG. 1 of the composite piezoelectric disk showing a convex spherical mechanical lens 4 in place over the front face 1 of disc 3. This permits mechanical focusing in all directions to be utilized.

FIG. 3 illustrates a top view of the electrode pattern configuration of the composite piezoelectric disk used in the transducers of the present invention. The front electrode transducer elements 5a, 5b, 5c, . . . are obtained by cutting through the electrode surface 1. The back electrode transducer elements 6a, 6b, 6c, . . . , shown by dotted lines in FIG. 3, are cut through the back electrode 2 at an angle to the lines defining the front electrodes. The electrodes of the composite piezoelectric material are scratched through the conductive layer rather than diced through the piezoelectric material on both sides of the piezoelectric disk. While the angle shown in the drawing is 90°, other angles may be utilized.

Figure 4:
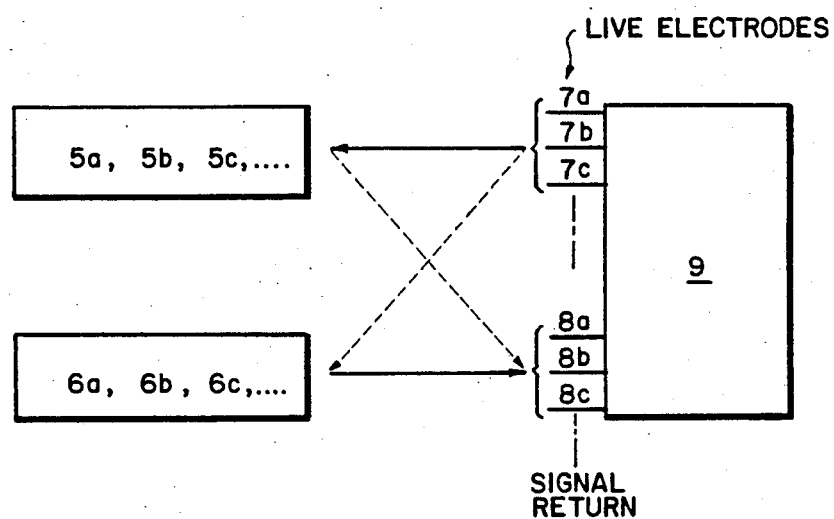
FIG. 4 is a functional diagram of the basic electronic configuration for use with bi-plane phased array of the present invention.

FIG. 4 is a diagrammatic representation of the basic configuration for the electronics required for the bi-plane phased array. In this figure, the reference numeral 9 designates the phased array electronics for transmitting, receiving, steering and focusing. The front face elements 5a, 5b, 5c . . . and the back face elements 6a, 6b, 6c . . . are alternately connected to the live electrodes 7a, 7b, 7c . . . for the signal and the signal return paths 8a, 8b, 8c . . . .

The phased array circuits 9 provide the means to pulse alternately all transducer elements on one electrode surface, while grounding the transducer elements on the other electrode surface to effect a sector scan in two planes, alternately, such that an image in one direction is followed quickly by an image in a second direction, thus producing a dynamic image of a bodily function. Such circuits are known in the art. The arrows at the ends of the solid lines in the drawing indicate the paths for a sweep perpendicular to the conductive electrode cuts on the front face 1 of the composite piezoelectric material. The arrows at the ends of dotted lines signify the paths for a sweep perpendicular to the cuts of the conductive electrode on the back face 2 of the composite piezoelectric material.

For n electrodes on each major surface, thus a total of 2n electrodes, 2 n electrical connections are required for the bi-plane phased array of this invention. In contrast, the prior art mosaic electrode patterns require $n^2$ connections for n electrodes.

The bi-plane phased array, using both major surfaces of a composite piezoelectric disk, permits the real time imaging of two sector planes. This bi-plane approach is particularly of value for real time evaluation of cross-sections of the heart.

The area of the composite piezoelectric disk underlying each of the electrodes defines a separate transducer element. In operation, either the front electrodes or the back electrodes are grounded and the phasing is performed with the remaining free electrodes. The spherical mechanical lens secures focusing in the other direction. Since no dicing is used and negligible cross-coupling is mandatory, composite piezoelectric material is used.

The mechanical lens of the present invention is a relatively standard lens which is made from a material with a rather low US propagation velocity. But the acoustical impedance should not be very different from the skin acoustical impedance, to suppress reverberation.

I claim:

1. A transducer array for ultrasonic medical imaging comprising:

a flat disc of a composite piezoelectric material, said composite material having a plurality of cylinders of a piezoelectric material disposed in an insulated damping material, each cylinder extending from one major surface of said disk to the other major surface of said disk perpendicular to the diameter of said disk, each of said cylinders being completely surrounded by said insulated damping material;

a conductive electrode material laminated on each of the major surfaces of said disc, forming electrode surfaces;

each of said electrode surfaces being scored to provide regions of electrically separated electrode elements, the scoring of one electrode surface being at an angle to the scoring of the second electrode surface whereby said regions overlie said plurality of cylinders so as to define a matrix of transducer elements;

a mechanical lens over one electrode surface;

means to connect alternately all electrode elements on one electrode surface with phased-array electronics while grounding the electrode elements on the other electrode surface thereby to successively connect portions of said transducer elements to form successive transducer sub-arrays in order to effect a sector scan in each of two planes, such that an image in one direction is followed by an image in a second direction, thus producing a dynamic image of a bodily function.

2. A transducer array comprising:

a disk of composite piezoelectric material having two major surfaces;

a plurality of adjacent electrodes disposed on each of said two major surfaces, those electrodes on a first surface being at an angle to those electrodes on the second surface, the area of the disk underlying each of the electrodes together with the overlying electrode area defining a separate transducer element;

means to connect alternately all transducer elements on one electrode surface with phased-array electronics while grounding the transducer elements on the other electrode surface to effect a sector scan in each of two planes, such that an image in one direction is followed by an image in a second direction, thus producing a dynamic image of a bodily function.

3. The transducer of claims 1 or 2 wherein said means to connect includes means for exciting by applying a short wide band pulse across the composite piezoelectric material.

* * * * *